June 28, 1949.  S. P. TOWNSEND  2,474,764
TWO-SPEED LAWN MOWER
Filed Feb. 18, 1946  2 Sheets-Sheet 1
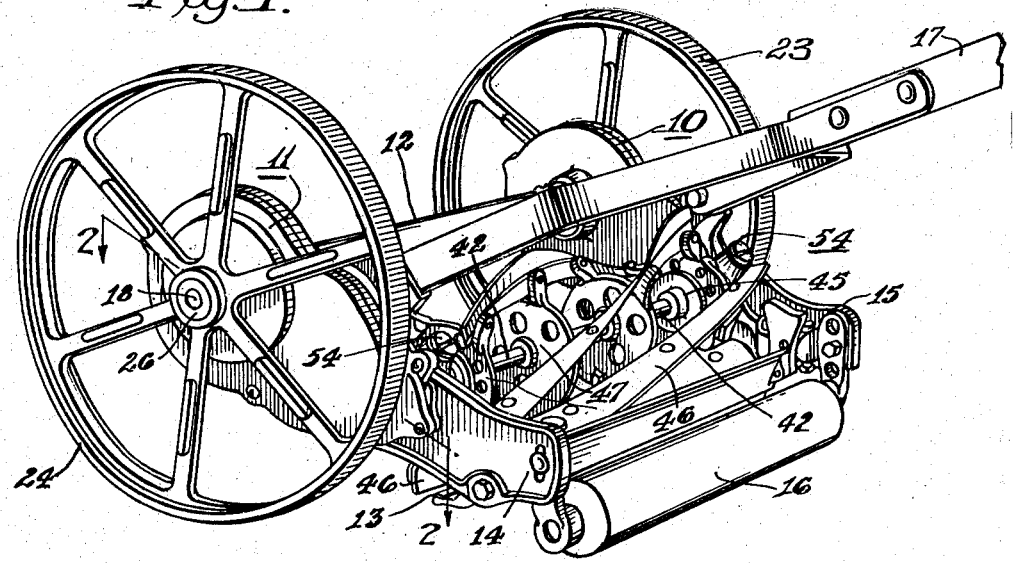
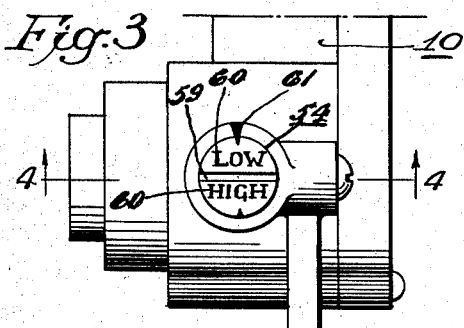
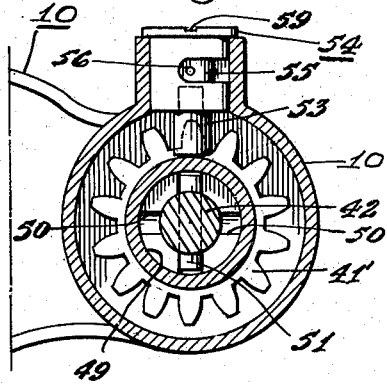
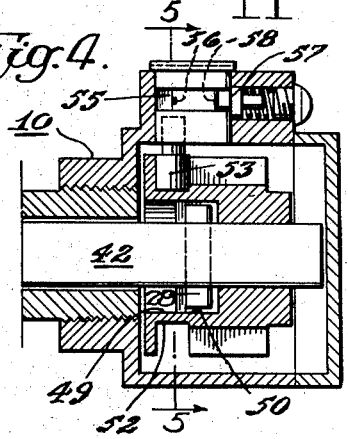
Inventor:—
Samuel P. Townsend
by his Attorneys
Howson + Howson

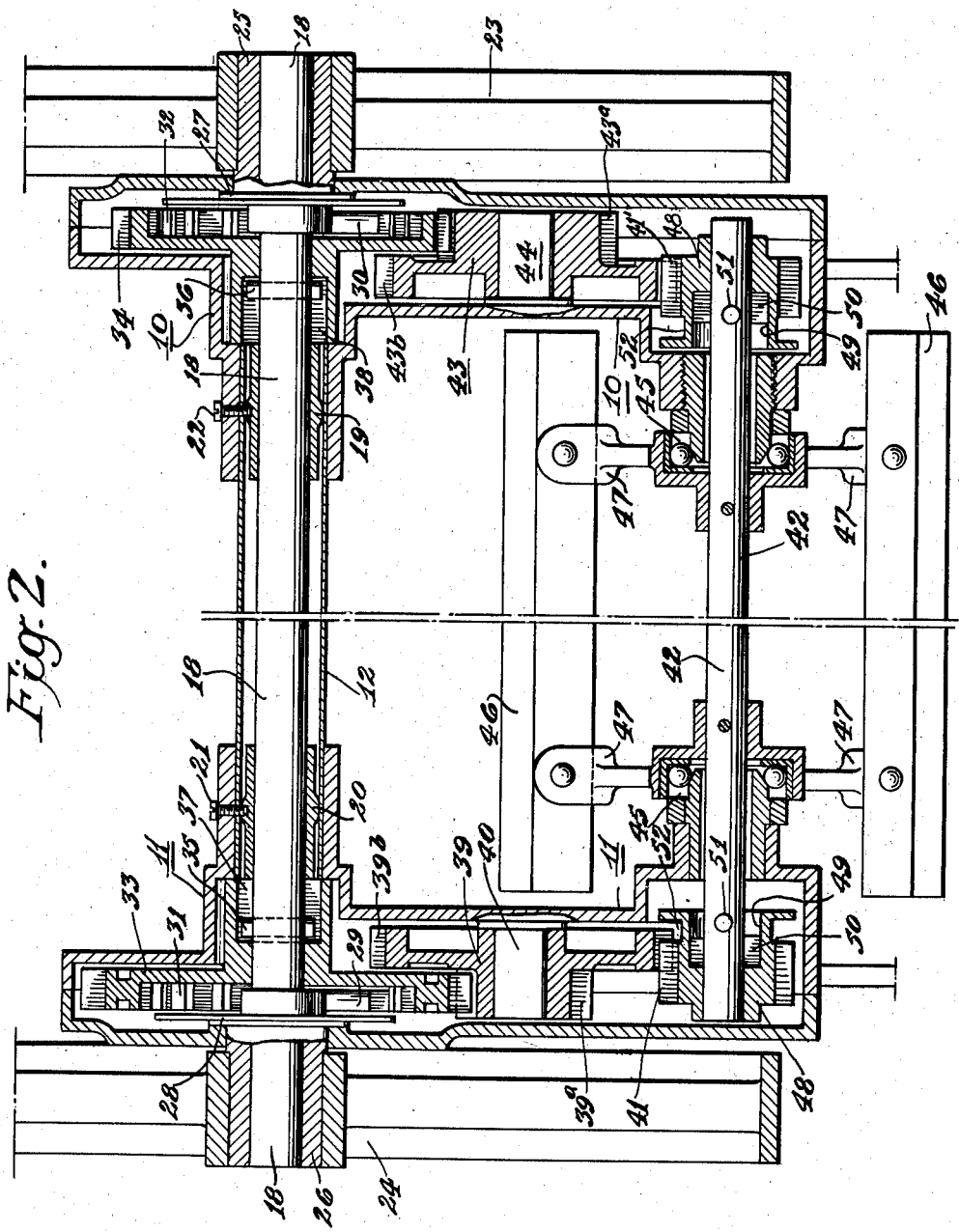

Patented June 28, 1949

2,474,764

UNITED STATES PATENT OFFICE 2,474,764

TWO-SPEED LAWN MOWER

Samuel P. Townsend, Maplewood, N. J.

Application February 18, 1946, Serial No. 648,288

5 Claims. (Cl. 56—249)

This invention relates to lawn mowers, and more particularly to the production of a lawn mower capable of performing satisfactorily in either long or short grass. The present application corresponds to abandoned application Serial No. 573,013, filed November 4, 1931.

As is well known to those familiar with the art, the smoothest cutting operation by the lawn mower is performed with the cutting reel operating at a fairly high speed and, as a matter of fact, at the highest practical speed. Operation at high speeds is readily possible in short grass where the resistance to movement of the mower over the ground is reduced and resistance to rotation of the reel occurs only during the cutting operation. Where the grass is high there occurs not only an increase in resistance to movement of the mower, but likewise an increase in resistance to the rotation of the reel, for the reel must act not only to perform the necessary cutting but likewise to batter down the tall grass disposed in its path. It is, therefore, an object of this invention to produce a lawn mower capable of reel operation at either high or low speeds and in which the change from high to low speed may be readily effected so that the mower may be adapted for use in either long or short grass.

A still further object of the invention is the production in an apparatus of this character of an arrangement such that the necessary gearing changes to provide the changeable speeds of the reel may be so disposed that they necessitate little or no change in the ordinary lawn mower construction as regards internal mechanisms and even less change in the outward appearance of the apparatus.

A still further object of the invention is the production of change speed mechanism permitting the continued use of the ratchet drive essential in successful operation of hand-operated lawn mowers.

A still further object of the invention is to provide control mechanism for the change speed mechanism which may be conveniently manipulated and which is so disposed that it is unnecessary to employ any other tools than a screw driver or a small wrench and which at the same time will securely maintain the selection.

These and other objects I attain by the construction shown in the accompanying drawings wherein, for the purpose of illustration, I have shown a preferred embodiment of my invention and wherein:

Fig. 1 is a perspective view of a lawn mower constructed in accordance with my invention;

Fig. 2 is an enlarged sectional detail as seen at 2—2 of Fig. 1;

Fig. 3 is an enlarged plan view showing the speed control;

Fig. 4 is a section on line 4—4 of Fig. 3; and

Fig. 5 is a section on line 5—5 of Fig. 4.

This invention comprises essentially the provision in a lawnmower of a main drive shaft journaled in spaced housings. Each end of the drive shaft has a rigidly mounted gear but the gear at one end of the shaft is larger than the opposite gear. The conventional lawnmower wheels are rotatably mounted on the drive shaft and are provided with a ratcheting connection between the hub of each driving wheel and the corresponding gear on the drive shaft. A knife reel is journaled in the rearward portion of each housing and the reel shaft extends into the housing and is provided at each end with a slidable gear, permitting selective engagement with each end of the reel shaft. A compound gear is interposed intermediate the main shaft gear and the reel shaft gear on either side but the hubs of the compound gears are of different diameters so that when the reel is driven through, for example, the right-hand gear train, a different gear ratio is achieved than when the reel is driven through the left-hand gear train. Means for engaging and disengaging the reel shaft gears is provided so that the reel may be selectively driven through either gear train.

Referring now more particularly to the drawings, a two-speed lawnmower constructed in accordance with the invention is provided with a pair of gear housings 10 and 11 maintained in spaced relation with respect to each other by means of a tubular member 12, and a conventional cutter bar 13 mounted in extensions 14 and 15 attached to housings 10 and 11. The lawnmower is provided with the usual adjustable roller 16 and handle assembly 17.

A main shaft 18 is journaled near the forward portion of housings 10 and 11 by means of self-aligning bearings 19 and 20 retained in the housings by set screws 21 and 22. Shaft 18 extends axially through housings 10 and 11 and journals a pair of driving wheels 23 and 24 at each end. The hubs of the driving wheels are rigidly keyed to sleeves 25 and 26 which extend inside housings 10 and 11 respectively and are provided with flanges 27 and 28 which axially retain the sleeves and wheels on shaft 18. The inner extremity of each sleeve 25 and 26 has pivoted pawls 29 and 30 which provide a ratcheting action with teeth 31 and 32 on gears 33 and 34. The individual ratcheting action of lawnmower wheels is well known and enables the lawnmower to be turned around corners and also to be pulled backwards to facilitate grass cutting.

Referring now to Fig. 2, it will be noted that left-hand gear 33 has a greater pitch diameter than right-hand gear 34. Each gear is non-rotatably but slidably attached to shaft 18 by means of pins 35 and 36, extending through shaft 18 and fitting in slots 37 and 38 in the hubs of gears 33 and 34 respectively. A compound gear 39 is journaled on pin 40 in housing 11 and is provided with a smaller gear 39a meshing with gear 33. The larger gear 39b of compound gear 39 meshes with a slidable gear 41 which is mounted on the reel shaft 42.

Referring now to housing 10, compound gear 43 is journaled in housing 10 by means of pin 44 and similarly has a smaller gear 43a meshing with gear 34 and a larger gear 43b which meshes with reel shaft gear 41' mounted on the opposite end of reel shaft 42.

It will be understood that the number of teeth in the large sections 39b and 43b of compound gears 39 and 43 is the same for each gear and that gears 41 and 41' are therefore interchangeable. However, the difference in ratio between the gears in housings 10 and 11 is achieved by providing a smaller ratio between gear 34 and gear 43a than is provided between gear 33 and gear 39a.

Reel shaft 42 is journaled in housings 10 and 11 by means of annular bearings 45, 45 and is provided with the conventional knives 46, 46 mounted on arms 47, 47.

Each gear 41, 41' comprises a hub portion 48 the inner end of which has the bore thereof increased as indicated at 49 and is formed at the inner end wall of this bore with slots 50 to receive the ends of a pin 51 projecting through the shaft 42. The gear at the inner end of the outer face thereof is formed with a groove 52 receiving a shifting pin 53 carried by a rotatable shifting button 54 mounted in the housing wall. The periphery of this shifting button has an annular groove 55 provided at diametrically opposed points with coves 56 in its bottom wall. Mounted in the housing is a spring-pressed plunger 57 adapted to slidably engage in groove 55 and having a tip 58 to engage in coves 56. The head of button 54 may be slotted as at 59 or otherwise adapted for engagement by a tool to rotate the same and is preferably provided with legends 60 coacting with an index 61 upon the housing so that an indication of the speed obtained may be provided. Whenever it is desired to change from one speed to another, it is simply necessary to rotate buttons 54 until the indices 61 coact with the legends corresponding to the desired speed. In each case the rotation will be through 180 degrees, this rotation through pins 53 shifting the associated gears 41, 41' so that the gear which was previously clutched to the shaft 42 is disengaged therefrom and the gear which was previously free is engaged with the shaft.

It will be noted that the space required to accommodate the gear trains as disclosed is little, if any, larger than the space ordinarily required to accommodate the driven train of the ordinary single speed lawn mower.

Since the construction employed is, obviously, capable of a considerable range of change and modification without in any manner departing from the spirit of the invention, I do not wish to be understood as limiting myself thereto except as hereinafter claimed.

I claim:
1. A two-speed lawnmower assembly comprising a pair of spaced housings, a main shaft journaled in said housings, a pair of driving wheels journaled on said main shaft, a reel shaft journaled in said housing, a gear mounted at each end of said reel shaft, means operatively associated with said gears for selectively clutching and declutching said gears to the reel shaft, a gear train in each housing connecting each reel shaft gear to the main shaft, said gear trains being of different ratios whereby when one reel shaft gear is clutched to the reel shaft a relatively slow speed of the reel is attained, and when the opposite gear is clutched to the reel shaft, a relatively high reel shaft speed is attained.

2. A lawnmower constructed in accordance with claim 1, in which the main shaft is provided with driving gears at opposite ends, said driving gears having different pitch diameters, ratcheting means between each driving gear and its cooperating drive wheel, a compound gear in each housing, said compound gears having the same pitch diameter for their larger gears, and different pitch diameters for their smaller gears, the smaller compound gears meshing with the driving gears on the main shaft, and means operatively associated with said gears for axially sliding the reel shaft gears on the reel shaft to selectively drive the reel shaft through either compound gear.

3. A two-speed lawnmower assembly comprising a pair of driving wheels, a pair of housings in spaced relation adjacent said driving wheels, transverse spacing and supporting means for said housings, a drive shaft near the forward end of said housings and journaled therein, a reel journaled near the rearward end of said housings, driving connections in said housings between the reel and the main shaft, the driving connections in one housing providing a different speed ratio between the reel and the main shaft than the driving connections in the other housing, and means operatively connected to said drive connection for selectively engaging and disengaging said driving connections.

4. A two-speed lawnmower assembly in accordance with claim 3 in which the means for selectively engaging said driving connections comprises a cam mounted in each housing and operable from outside the housing to engage and disengage the driving connection in each housing with the reel.

5. A two-speed lawnmower assembly in accordance with claim 3 in which the means for selectively engaging said driving connections comprises a cam mounted in each housing and operable from outside the housing to engage and disengage the driving connection in each housing with the reel, and an indicator on said housing showing the position of the cam.

SAMUEL P. TOWNSEND.

REFERENCES CITED

The following references are of record in the file of this patent:

UNITED STATES PATENTS

| Number | Name | Date |
|---|---|---|
| 1,160,297 | Lockwood | Nov. 16, 1915 |
| 1,279,267 | Coldwell | Sept. 17, 1918 |
| 1,401,156 | Jenkins | Dec. 27, 1921 |